United States Patent [19]

Stadler

[11] Patent Number: 5,559,491
[45] Date of Patent: Sep. 24, 1996

[54] AUTOMATICALLY ARMED VEHICLE ANTI-THEFT SYSTEM

[76] Inventor: David M. Stadler, 28421 Santa Barbara, Lathrup Village, Mich. 48076

[21] Appl. No.: 395,432

[22] Filed: Feb. 28, 1995

Related U.S. Application Data

[63] Continuation-in-part of Ser. No. 990,418, Dec. 15, 1992, Pat. No. 5,394,135, which is a continuation-in-part of Ser. No. 801,701, Dec. 2, 1991, Pat. No. 5,172,094.

[51] Int. Cl.$^6$ .................................................. B60R 25/10
[52] U.S. Cl. ..................... 340/426; 340/430; 340/425.5; 340/527; 340/528; 340/441; 307/10.2
[58] Field of Search .................................. 340/426, 428, 340/430, 425.5, 527, 528, 539, 441; 307/9.1, 10.1, 10.2; 180/287

[56] References Cited

U.S. PATENT DOCUMENTS

| | | | |
|---|---|---|---|
| 3,978,478 | 8/1976 | Schmitz | 340/528 |
| 4,754,255 | 6/1988 | Saunders et al. | 340/528 |
| 4,794,368 | 12/1988 | Grossheim et al. | 340/527 |
| 4,835,518 | 5/1989 | Hwang | 340/527 |

*Primary Examiner*—Donnie L. Crosland
*Attorney, Agent, or Firm*—Lyman R. Lyon

[57] ABSTRACT

A motorized vehicle anti-theft system which is passive by being automatically armed (i.e., does not require a vehicle occupant to set the system). Once power has been turned on to the vehicle, detection of an attempt to start the vehicle motor or the opening of a vehicle door starts a predetermined time cycle. If a first reset signal is not received before the end of the time cycle, a vehicle disabling circuit is set. After that, a detection of actuation of the vehicle brake will trigger the disabling circuit to only permit the vehicle engine to operate properly near the engine idling speed, and set off an alarm. More specifically, the engine's operating speed is continually monitored, and after the disabling circuit is triggered, if the contemporaneous engine operating speed exceeds the normal idling speed, the vehicle fuel supply is intermittently interrupted to cause violent lunging of the vehicle. Only proper generation of the first and a second reset signal will allow the vehicle to be operated properly again.

17 Claims, 3 Drawing Sheets

5,559,491

AUTOMATICALLY ARMED VEHICLE ANTI-THEFT SYSTEM

CROSS-REFERENCE TO RELATED APPLICATIONS

This application is a continuation-in-part of patent application Ser. No. 07/990,418, filed on Dec. 15, 1992, now U.S. Pat. No. 5,394,135, which is a continuation-in-part of patent application Ser. No. 07/801,701, filed on Dec. 2, 1991, now U.S. Pat. 5,172,094.

BACKGROUND OF THE INVENTION

The present invention generally relates to theft prevention systems and more specifically to a system for preventing the theft of motor vehicles.

Automobile theft has been a fact of life throughout the history of the automobile. Heretofore, most thefts have occurred when the automobile is parked and unoccupied.

A recent phenomenon however, is theft of an automobile from an occupant, at gunpoint. A solution to the automobile theft problem must address this new dimension of car theft. Conventionally, anti-theft systems require an occupant to arm or set the system before a theft can be deterred.

SUMMARY OF THE INVENTION

The present invention solves the above stated problem by providing a vehicle anti-theft system in which actuation of the system does not require any action by an occupant of the vehicle. A basic premise underlying the concept of the present invention is that an occupant is under extreme duress when approached by a thief and therefore incapable or ill advised to perform a physical act to activate an anti-theft system. In accordance with the present invention, the anti-theft system is automatically armed at the end of a predetermined time period if an occupant does not properly deactivate (reset) the system. Once the anti-theft system is armed, the vehicle engine will only be able to operate properly near the engine's normal idling speed after a first actuation of the brake pedal. Only proper resetting of both the vehicle disabling circuitry and the anti-theft system will deactivate (reset) the entire system so the vehicle can again be operated normally.

It is therefore an object of the present invention to provide an improved vehicle anti-theft system which is automatically armed in response to a detected condition.

It is another object of the present invention to provide an improved vehicle anti-theft system which disables the vehicle enough to encourage a thief to abandon the vehicle shortly after theft.

It is another object of the present invention to provide a method of passively preventing a theft of a motorized vehicle, wherein the method provides for disabling the vehicle in a manner which only permits the vehicle engine to operate properly near the engine idling speed once the anti-theft system is triggered and there is a detection of vehicle deceleration.

It is yet another object of the present invention to provide an improved automatically arming vehicle anti-theft system and method which are easily retrofitted to an existing vehicle engine.

In accordance with the present invention, an automatically armed motorized vehicle anti-theft system comprises a first sensor means for providing an output signal in response to detection of either an attempt to start the vehicle motor or the opening of a vehicle door (with the engine running or the ignition key "on") and a timer means having a timer cycle. The timer means is responsive to detection of vehicle power activation and to the first sensor means output signal for automatically starting the timer cycle. When the timer cycle is complete, the timer means outputs a trigger signal. A means for generating a first reset signal is further provided to reset the timer means. An engine speed detection means is coupled to the vehicle engine for providing a signal representative of contemporaneous engine operating speed, and a second sensor means provides an output signal in response to actuation of a vehicle brake mechanism. A vehicle disabling means is responsive to the trigger signal, engine operating speed signal and the second sensor means output signal for only permitting the vehicle engine to operate properly near an engine idling speed in response to detection of a vehicle brake actuation after the receipt of the trigger signal.

The system further preferably comprises a means for generating a second reset signal to reset the vehicle disabling means, wherein after the vehicle is disabled, the anti-theft system can only be reset and the vehicle operated normally again by the generation of both the first and second reset signals.

In further accordance with the present invention, a method for passively preventing a theft of a motorized vehicle comprises the steps of detecting power activation of the vehicle, detecting an attempt to start the vehicle motor or open a vehicle door, and in response to both of these steps, automatically initiating a predetermined time cycle. Subsequently, a determination is made concerning whether a first reset signal is generated. If a first reset signal is not generated, a trigger signal is generated at the end of the time cycle. The vehicle is disabled so that the vehicle engine will only operate properly near an engine idling speed in response to the first detection of a vehicle brake actuation after the trigger signal has been generated. The method further comprises the step of detecting whether a second reset signal is generated after the vehicle is disabled, and in response to the generation of the second rest signal, the above-described time cycle and disabling step are restarted, wherein once the vehicle is disabled, normal operation can only be achieved after generation of both the first and second reset signals.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
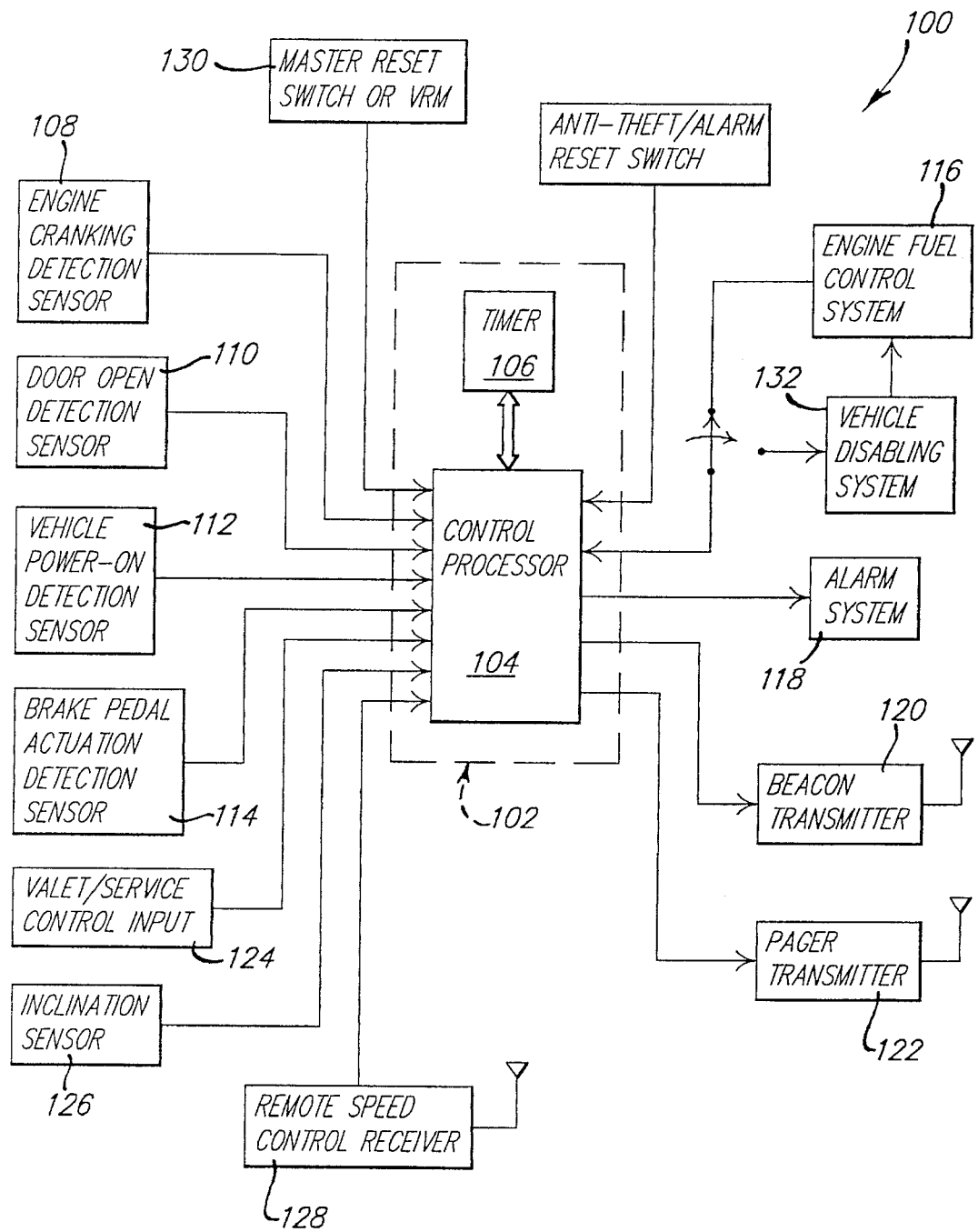
FIG. 1 is a block diagram of the automatically armed vehicle anti-theft system according to the present invention.

Referring to FIG. 1 there is shown a general block diagram of a vehicle anti-theft system 100 in accordance with the present invention. The anti-theft system 100 utilizes a control unit 102 having a control processor 104 and a timer circuit 106 provided with suitable programming to operate as described hereinbelow. Inputs to the control processor 104 are received from an engine cranking detection sensor 108, vehicle door open detection sensor 110, vehicle power-on detection sensor 112, and a vehicle brake actuation detection sensor 114. The control processor 104 controls operation of an engine fuel supply control system 116, an alarm system 118, and an optional beacon/locating transmitter 120 and an owner alerting system triggered pager transmitter 122. The control processor 104 and the timer circuit are bidirectionally coupled, and in fact may be integrated into the same customized chip set. An optional valet/service technician bypass control input 124, vehicle inclination sensor 126, and vehicle remote speed control receiver 128 provide additional system security functions, and are described in more detail hereinbelow.

The self-setting programmable timer circuit 106 operates as a control element for automatically arming the system 100 of the present invention. In operation, timer circuit 106 is automatically set when activation of vehicle power, e.g., by way of an ignition key, is detected by sensor 112. Once the timer circuit is set, an input signal from either the engine cranking detection sensor 108 or the door open detection sensor 110 will start the timer cycle. The timer cycle can be set for any desired length of time. In the preferred embodiment, the timer cycle can be programmed to have a time interval between 30 to 60 seconds.

When the timer circuit 106 begins its timer cycle, only an input signal from a master system reset 130 can properly deactivate the timer circuit 106. The generation of the master system reset 130 requires a particular physical action from an occupant in the vehicle. The driver can be reminded to enter the master system reset signal with an audible warning cadence. If a master system reset signal is not received, the timer circuit 106 will continue the timer cycle. If power is deactivated and subsequently reactivated (for example, by way of an ignition key), the timer 106 automatically restarts the timing sequence at the point in the timer cycle where the power had been turned-off. Thus, merely deactivating vehicle power will not deactivate or reset the timer circuit 106.

Once the timer circuit 106 completes the timer cycle, the control processor 104 is placed into an anti-theft/alarm control mode. After being placed into the anti-theft/alarm control mode, the processor 104 is triggered by the next input signal received from the brake pedal actuation sensor 114. In accordance with the present invention, electrical current will always pass through control processor 104 to the vehicle's fuel control system 116 and brake light during normal vehicle operation. When the control processor 104 is triggered due to brake pedal actuation, a vehicle disabling circuit 132 is activated to periodically disrupt current to the vehicle fuel control system, e.g. the vehicle fuel pump, whenever the vehicle is accelerated. The operation of vehicle disabling circuit 132 is described more fully hereinbelow. Alarm circuitry 118 is also activated by control processor 104.

With the present invention, the anti-theft/alarm control mode can only be reset by way of an anti-theft/alarm reset signal 134. The reset signal 134 is preferably a personal security code input via a keyboard. Once the control processor 104 triggers the vehicle disabling system 132, the anti-theft system 100 is placed into a "dooms-day" mode. Deactivating vehicle power will not deactivate the anti-theft system. If vehicle power were reactivated, the alarm circuitry 118 would still be activated and the timer circuit 106 would automatically restart the timer cycle. In this way, even if a thief were to somehow generate the reset signal 134, the timer circuit 106 would again complete its time cycle so that the control processor 104 would again be triggered by the next actuation of the brake pedal. Once the system 100 has been triggered, only proper generation of both the anti-theft/alarm reset signal 134 and the master system reset signal 130 can deactivate the anti-theft system.

With respect to the various system elements described above, one or ordinary skill in the art will readily appreciate that sensor 108 can operate by detecting movement of an ignition key from an instrumentation power mode to an engine ignition mode, and sensor 110 can be responsive to a door switch such as triggers a vehicle dome light. Master reset 130 and anti-theft/alarm reset signals can be generated by switches which are disguised, concealed or hidden somewhere within the vehicle, a voice or speech recognition microprocessor, and/or a security code/keypad combination.

Figure 3:
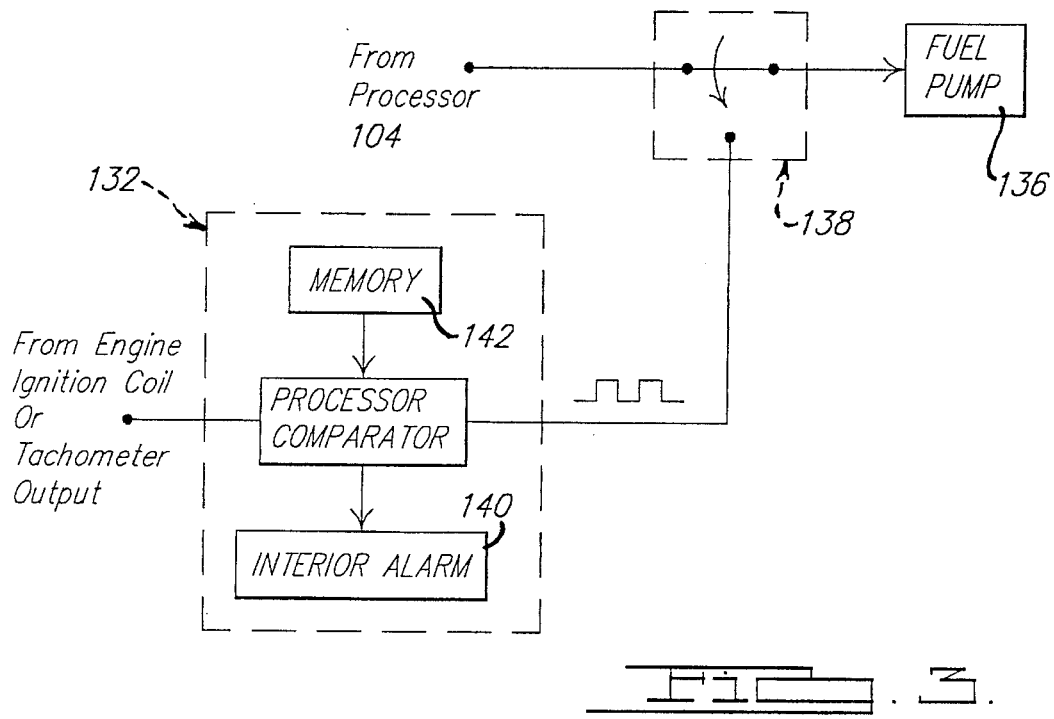
FIG. 3 is a block diagram of the vehicle disabling system shown in FIG. 1.

Referring now to FIG. 3, the vehicle disabling circuit 132 is shown in more detail. As noted above, once the control processor 104 has been set into the anti-theft/alarm control mode, the output of the processor 104 causes electrical current flowing to the vehicle fuel pump 136 to be shunted (symbolically shown as switch 138) to an output terminal of a processor/comparator circuit 140. The processor/comparator 140 has an input connected to a vehicle ignition coil or other conventional tachometer output terminal on the vehicle engine. Processor/comparator circuit 140 includes a suitable memory device 142, such as a RAM, in which a normal engine operating speed, e.g. 1000 to 1200 RPM, is either prestored or tracked and stored during normal operation of the vehicle. The processor/comparator circuit 140 effectively provides a normally closed switch which automatically begins to toggle between open and closed when contemporaneous engine operating speed exceeds the predetermined engine idle speed stored in memory 142. The increase in engine speed is responsive to the driver depressing the vehicle accelerator pedal. Thus, when the vehicle engine is at, or near normal idling speed, a steady flow of electrical current is supplied through the processor/comparator 140 output to power the fuel pump 136, and when the vehicle accelerator pedal is depressed, the comparator 140 intermittently cuts off current flow to the fuel pump.

Thus, with the above arrangement, the vehicle is not completely disabled when the accelerator pedal is depressed, thereby avoiding a potentially hazardous situation due to the vehicle stopping in the middle of traffic. Rather, when the vehicle's accelerator pedal is depressed, the processor/comparator circuit 140 automatically causes an intermittent electrical current to be supplied to the fuel pump 136 thereby causing the vehicle to violently jerk as the fuel supply to the engine is repetitively turned on and off. When the accelerator pedal is released, the engine returns to idling speed causing the processor/comparator circuit 140 to supply a steady flow of electrical current to the fuel pump thereby allowing the engine to operate normally.

In addition to intermittently supplying current to the fuel pump 136, the present invention further triggers a high decibel audible alarm device 144 located within the interior of the vehicle whenever the processor/comparator circuit 140 is toggling the fuel pump.

With the above described arrangement, the vehicle disabling circuit 132 of the present invention only permits the vehicle engine to operate properly near the engine idling speed. The violent lurching of the vehicle coupled with the piercing audible alarm 144 will effectively cause a thief to abandon the vehicle, and the ability to have a limited control of the vehicle will allow the thief to safely pull out of traffic before abandoning the vehicle. It is further noted that while vehicle disabling circuit 132 has been shown and described as constituting a separate subsystem, one of ordinary skill in the art will readily appreciate that the processor/comparator 140 and memory 142 can be advantageously integrated into control processor 104.

Figure 4:
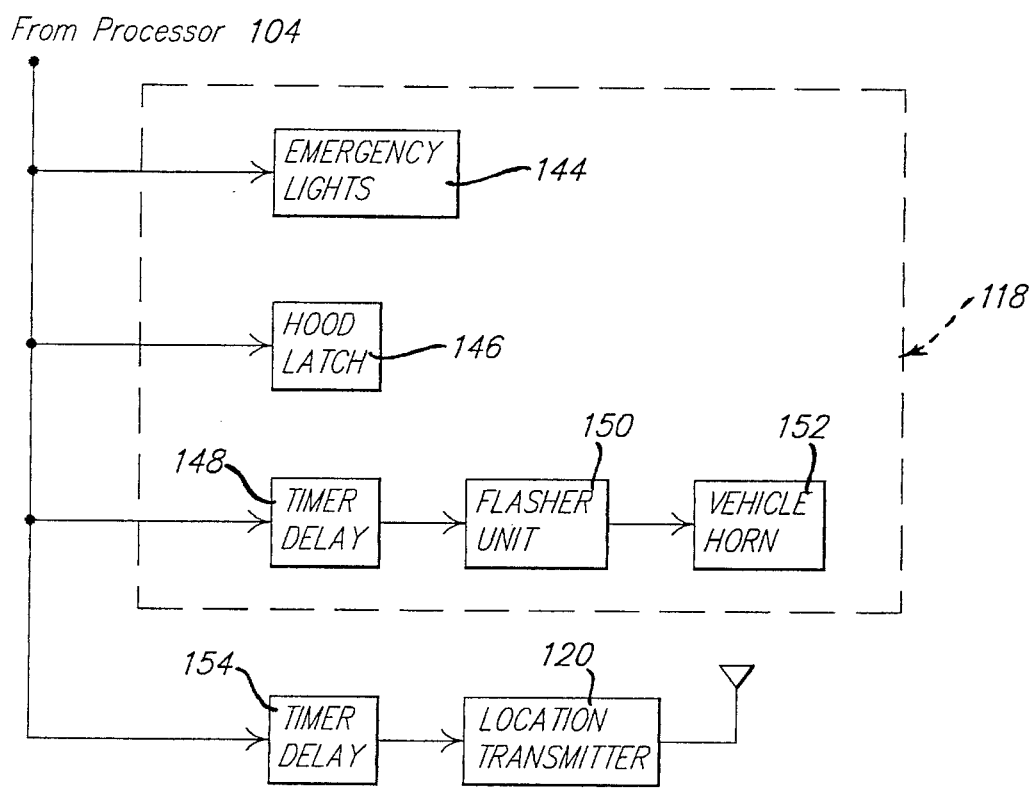
FIG. 4 is a block diagram of the vehicle alarm system shown in FIG. 1.

In further accordance with the present invention, an output of control processor 104 activates the alarm circuitry 118. As shown in FIG. 4, control processor 104 causes the vehicle's four-way emergency lights 144 to blink, a hood latch 146 is activated to prevent access to the vehicle engine compartment, and the vehicle horn 152 is activated through a timer delay unit 148 and a flasher unit 150. The flasher unit 148 repetitively sounds the horn 152, and the timer delay unit 630 automatically turns off the horn 628 after a predetermined time period, such as five minutes, to prevent draining of the vehicle battery. Also, the optional location beacon transmitter 120 can be activated after a predetermined time delay set by a timer delay unit 154. The optional location transmitter 120 transmits a radio beacon signal which can be tracked by a separate tracking receiver (not shown), thereby facilitating recovery of the stolen vehicle.

In further accordance with the present invention, several optional security options can be included in system 100 to further improve the system's abilities to thwart would-be thieves. In a first optional arrangement, a small activating transmitter and receiver can be provided to allow remote and manual tripping of the system 100. The transmitter, for example, can be located on a key chain carried by the vehicle owner. The receiver operates to receive an activate signal from the transmitter and generates an output which causes the control processor 104 to the bypass timer circuit 106 and immediately set the system. This arrangement would be particularly suited to an armored car. Guards outside the vehicle could then activate the anti-theft system via the transmitter immediately upon occurrence of a theft. A transmitter/receiver could be selected to provide a reception range of up to 500 feet.

In a second optional arrangement, the control processor 104 can include an intrusion warning subroutine that can be activated by a vehicle owner after parking and exiting the vehicle. In response to the timer circuit 106 being either activated or triggered, the control processor 104 will activate a vehicle's cellular telephone/pager transmitter 122 to transmit a preprogrammed pager access number. This will in turn transmit a vehicle intrusion warning message to the owner's pager.

In a third optional arrangement, the control processor 104 can be programmed with a modified anti-theft/alarm mode for situations involving abduction of a vehicle driver. More specifically, if a driver is forced to drive at gunpoint, the driver can activate the abduction mode by depressing the brake pedal a predetermined number of times within a given time interval during the timer cycle. Once the abduction mode is activated, the vehicle is allowed to operate normally, i.e., the vehicle disabling system 132 and the alarm system 118 are inhibited, while the beacon transmitter 120 is activated to transmit an appropriately coded marker signal indicating an abduction in progress. In addition, if a voice or speaker recognition microprocessor is utilized for generating the master reset signal 130, a prerecorded emergency abduction template can be activated by the driver, such as by saying "Where are you taking me?" or "Please don't hurt me." If the abduction template is matched within the timer cycle, the abduction mode will be activated.

In a fourth optional arrangement, a valet/service technician mode can be activated which subsequently inhibits the system 100 for a predetermined and/or programmable period of time (such as 10 minutes) to permit a valet to park and retrieve the vehicle, or the technician to service the vehicle without triggering the system. This mode can be selectively entered via control input 124 by entering a particular password and/or special key.

In a fifth optional arrangement, the inclination sensor 126, such as mercury switch, is utilized to trigger the system 100 if one end of the vehicle is lifted past a certain height. More specifically, many vehicles today are stolen by being towed away by "legitimate" looking tow vehicles. If one end of the vehicle is lifted without otherwise properly deactivating the system 100, control processor 104 triggers the anti-theft/ alarm mode and the beacon transmitter 120. A back-up battery system can be utilized to insure the beacon transmitter continues to emit a signal even if the vehicle's main battery is disconnected by the would-be thieves.

In a sixth optional arrangement, triggering of the system 100 allows law officials to track a stolen vehicle's movement via the beacon transmitter 120. When the police are within sight of the moving stolen vehicle, an appropriately coded transmitter can be activated by the police to transmit a vehicle speed control signal to the remote speed control receiver 128. With the arrangement, pursuing police can automatically trigger the vehicle disabling system 132.

In a seventh arrangement, systems having a speaker recognition microprocessor can be programmed to trigger the system upon detecting an alcohol or drug impaired driver. More specifically, special templates having particular cadences can be stored (such as by court judgment), and if the driver is unable to match the template, the alarm system 118 and vehicle disabling system can be activated. Alternatively, the control processor 104 can be programmed to simply cut off all power to the vehicle fuel control system 116. Upon activation of the inebriation mode, a special reset password having a difficult series/sequence of numbers can be required to generate sets 130 and 134.

Figure 2:
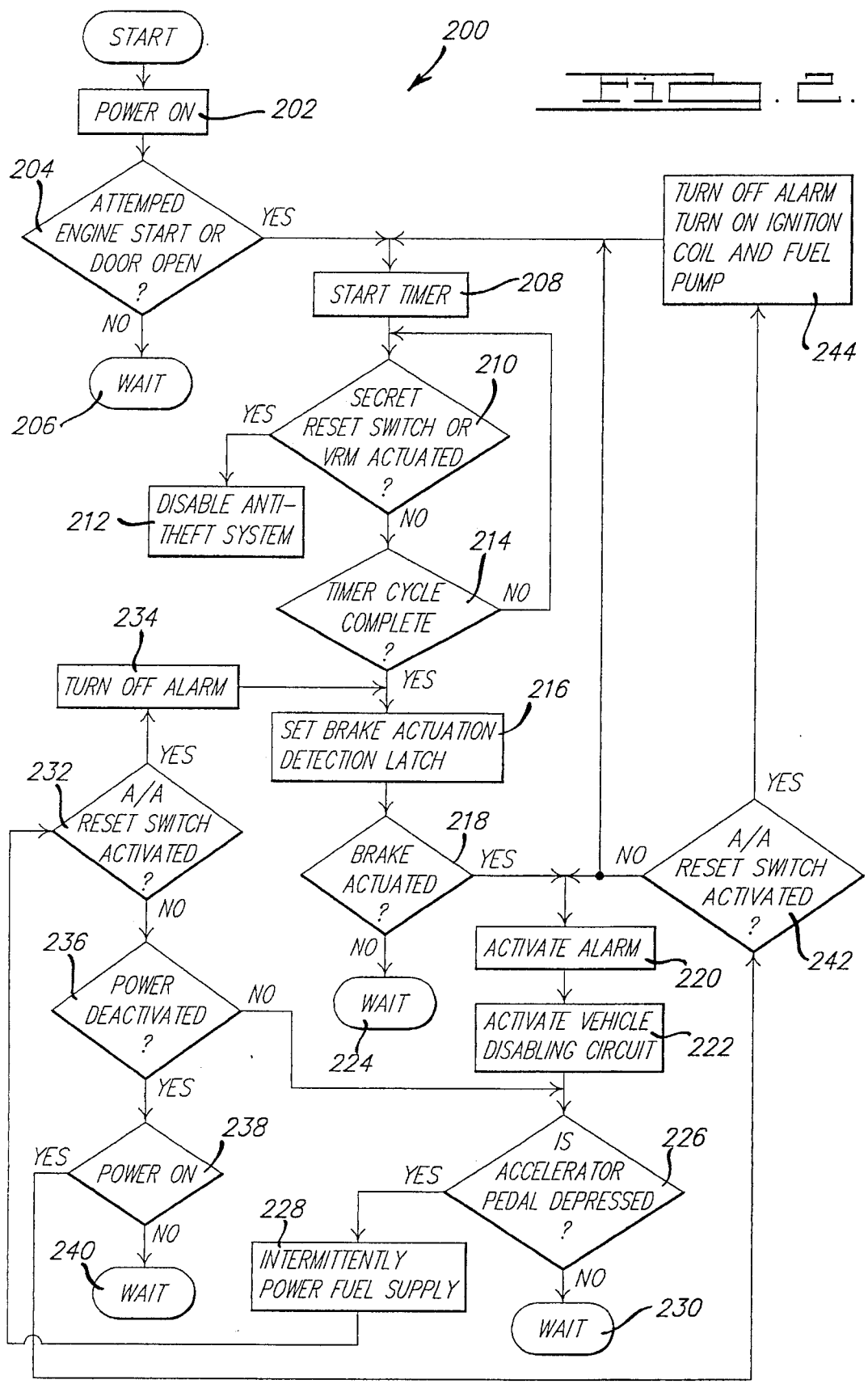
FIG. 2 is a flow chart illustrating the operating of the system according to the present invention.

Referring now to FIG. 2 there is shown a flow chart illustrating the basic operation 200 of the anti-theft system 100 according to the present invention. First, the system determines that power has been turned on in the vehicle 202. Once power is turned on, the system determines if there is an attempt to start the engine, or a door is opened 204. If a detection is not made, the system waits 206. If there is a detection, the system will automatically start the timer at 208.

Once the timer is started, the system will determine if the master system reset switch or voice/speaker recognition microprocessor (VRM) have been properly actuated at step 210. If so, the anti-theft system is deactivated or disabled 212. If not, the system checks to see if the timer cycle has been completed 214. If not, the system will keep checking for proper receipt of the master system reset signal.

Once the timer cycle is complete, the system will set a brake pedal actuation detection latch at step 216. If there is detection of brake pedal actuation 218, the system then actuates an alarm at step 220, and activates the vehicle disabling circuit at step 222. If brake pedal actuation is not detected, the system just waits 224. After the vehicle disabling circuit is activated, the system determines if the vehicle accelerator pedal has been depressed 226, and in response thereto intermittently powers the fuel supply 228 if the accelerator pedal is depressed, or just waits 230.

Subsequently, the system then determines if the anti-theft/ alarm system reset switch has been actuated 232. If so, the system deactivates the alarm and vehicle disabling circuit at step 234, but resets the brake pedal actuation detection latch 216. If the anti-theft/alarm system reset switch has not been actuated, the system determines if vehicle power has been deactivated 236. If not, the car remains disabled with the system continuously checking for the anti-theft/alarm system reset signal.

If power is deactivated, the system then determines if power is reactivated at step 238. If not, the system just waits 240. If power is reactivated, then the system determines if the anti-theft/alarm system reset switch has been actuated 242. If not, the motorized vehicle remains disabled with the alarm actuated at steps 220 and 222. The system also restarts the timer at 208. If the anti-theft/alarm system reset switch has been actuated, the system then turns off the alarm/turns on the fuel supply system and ignition system 244 and restarts the timer at 208. The whole process is continually repeated until the master system reset switch or VRM are properly actuated.

It will be appreciated that other modifications can be made in accordance with the present invention. For example, an acceleration sensor, or accelerometer, can be used in place of a brake pedal actuation sensor for detecting deceleration of the vehicle. Further, electrical current to the vehicle's ignition coil(s) could be interrupted instead of the fuel pump. Therefore, it will be understood that the foregoing description of the preferred embodiment(s) of the present invention is for illustrative purposes only, and that the various structural and operational features herein disclosed are susceptible to a number of modifications and changes none of which departs from the spirit and scope of the present invention as defined in the appended claims.

I claim:

1. An automatically armed motorized vehicle anti-theft system comprising:

a first sensor means for providing an output signal in response to detection of either an attempt to start the vehicle motor or the opening of a vehicle door;

a timer means having a timer cycle, said timer means being responsive to detection of vehicle power activation and to said first sensor means output signal for automatically starting the timer cycle, wherein when the timer cycle is complete, said timer means outputs a trigger signal;

means for generating a first reset signal to reset said timer means;

an engine speed detection means coupled to the vehicle engine for providing a signal representative of contemporaneous engine operating speed;

a second sensor means for providing an output signal in response to actuation of a vehicle brake mechanism; and a vehicle disabling means which is responsive to said trigger signal, said engine operating speed signal, and said second sensor means output signal, for only permitting the vehicle engine to operate properly near an engine idling speed in response to detection of a vehicle brake actuation after the receipt of said trigger signal.

2. The system of claim 1 further comprising a means for generating a second reset signal to reset said vehicle disabling means, wherein after the vehicle is disabled, said anti-theft system can only be reset and the vehicle operated normally again by the generation of both said first and said second reset signals.

3. The system of claim 1 wherein said vehicle disabling means comprises means for comparing said engine operating speed signal to a predetermined idle threshold value, and means connected to said comparing means for disrupting electrical current to a vehicle fuel supply control system in response to said threshold being exceeded.

4. The system of claim 1 wherein said vehicle disabling means further actuates a high decibel audible alarm inside the vehicle when the vehicle is disabled.

5. The system of claim 1 wherein said first reset signal generating means comprises a voice or speaker recognition means which generates said first reset signal in response to detecting an authorized voice or speech input.

6. The system of claim 5 further comprising means connected to said voice or speaker recognition means for detecting if the person speaking is inebriated, said inebriation detecting means activating said vehicle disabling means in response to detection of an inebriated driver.

7. The system of claim 5 wherein said voice or speaker recognition means generates an abduction mode triggering signal in response to detecting a predetermined abduction input, and an abduction mode control means for inhibiting said vehicle disabling means and activating a location tracking transmitter means in response to said abduction mode triggering signal.

8. The system of claim 1 further comprising an abduction mode activating means for detecting a predetermined number of vehicle brake mechanism actuations within a predefined interval during said timer cycle, and an abduction mode control means responsive to said abduction mode activating means for inhibiting said vehicle disabling means and activating a location tracking transmitter means.

9. The system of claim 1 further comprising means for activating said vehicle disabling means in response to detection of one end of the vehicle being lifted a particular height.

10. The system of claim 1 further comprising a means for activating a location tracking transmitter means when said vehicle is disabled so that the location of said disabled vehicle can be determined.

11. A method for passively preventing a theft of a motorized vehicle comprising:

a) detecting power activation of the vehicle;

b) detecting an attempt to start the vehicle motor or open a vehicle door;

c) in response to both steps a) and b), automatically initiating a predetermined time cycle;

d) detecting whether a first reset signal is generated;

e) generating a trigger signal at the end of said time cycle if a first reset signal is not generated;

f) detecting actuation of a vehicle brake mechanism;

g) detecting a contemporaneous vehicle engine operating speed; and h) disabling the vehicle by intermittently disrupting operation of the vehicle engine whenever the contemporaneous operating speed exceeds an idling threshold value in response to the first detection of vehicle brake actuation after said trigger signal has been generated.

12. The method of claim 11 further comprising the step of detecting whether a second reset signal is generated after the vehicle is disabled, and in response to the generation of said second reset signal, restarting said time cycle and repeating steps f), g) and h), wherein only generation of both said first and said second reset signals will again permit normal operation of the vehicle.

13. The method of claim 11 wherein step h) further includes actuating a high decibel alarm inside the vehicle when the vehicle is disabled.

14. The method of claim 11 wherein said first reset signal is generated by a voice or speaker recognition means.

15. The method of claim 11 further comprising the steps of detecting an abduction of the vehicle driver, and in response thereto, inhibiting the disabling of the vehicle and activating a location tracking transmitter means.

16. The method of claim 11 further comprising the steps of detecting one end of the vehicle being lifted a particular height, and in response thereto, disabling the vehicle at step h).

17. The method of claim 11 further comprising the steps of detecting if a driver is inebriated, and in response thereto, disabling the vehicle at step h).

* * * * *